(12) United States Patent
Aikawa et al.

(10) Patent No.: US 11,877,098 B2
(45) Date of Patent: Jan. 16, 2024

(54) INFORMATION PROCESSING APPARATUS, LIGHTING DEVICE, AND NON-TRANSITORY COMPUTER READABLE MEDIUM STORING PROGRAM

(71) Applicant: FUJIFILM Business Innovation Corp., Tokyo (JP)

(72) Inventors: Kiyofumi Aikawa, Kanagawa (JP); Kei Shimotani, Kanagawa (JP); Daisuke Matsumoto, Kanagawa (JP); Shuhei Kobayakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 600 days.

(21) Appl. No.: 16/885,292

(22) Filed: May 28, 2020

(65) Prior Publication Data
US 2021/0150864 A1 May 20, 2021

(30) Foreign Application Priority Data

Nov. 18, 2019 (JP) ................................. 2019-207798

(51) Int. Cl.
*G06V 10/145* (2022.01)
*H04N 7/18* (2006.01)
(Continued)

(52) U.S. Cl.
CPC ............ *H04N 7/188* (2013.01); *G06V 10/141* (2022.01); *G06V 10/145* (2022.01); *G06V 20/52* (2022.01);
(Continued)

(58) Field of Classification Search
CPC ........ H04N 7/188; H04N 23/72; H04N 23/60; H04N 23/698; H04N 23/71; H04N 23/73;
(Continued)

(56) References Cited

U.S. PATENT DOCUMENTS 10,270,977 B2   4/2019 Ishihara

FOREIGN PATENT DOCUMENTS

| JP | 2005252399 | 9/2005 |
| JP | 2015177262 | 10/2015 |
| JP | 2017028673 | 2/2017 |

OTHER PUBLICATIONS

JP 2005-252399 Translation (Year: 2005).*
(Continued)

*Primary Examiner* — Cynthia Segura
*Assistant Examiner* — Angel L Garces-Rivera
(74) *Attorney, Agent, or Firm* — JCIPRNET

(57) ABSTRACT

An information processing apparatus includes a processor configured to acquire, among a plurality of images obtained by periodically capturing one or more lighting devices that repeat blinking according to a determined pattern, a first image and a second image in which a lighted lighting device is captured and in response to a distance from a position of the device indicated by the first image to a position of the device indicated by the second image being within a range corresponding to a period from a time of capturing the first image to a time of capturing the second image, regard the lighting device indicated by the first image and the lighting device indicated by the second image are the same, and specify the pattern of the lighting device that has been regarded the same.

20 Claims, 7 Drawing Sheets

(51) Int. Cl.
*G08B 5/38* (2006.01)
*G06V 10/141* (2022.01)
*H04N 23/72* (2023.01)
*G06V 20/52* (2022.01)
*G06V 10/10* (2022.01)

(52) U.S. Cl.
CPC .............. *G08B 5/38* (2013.01); *H04N 23/72* (2023.01); *G06V 10/16* (2022.01)

(58) Field of Classification Search
CPC .... H04N 23/74; G06V 10/141; G06V 10/145; G06V 20/52; G06V 10/16; G08B 5/38
See application file for complete search history.

(56) References Cited

OTHER PUBLICATIONS

Nobuyuki Matsushita et al., "ID Cam: image sensor capable of acquiring the scene and the ID at the same time", Interaction 2002, Mar. 2002, pp. 9-16, with english translation thereof.
Sadanori Ito et al., "Wearing type Interactive Recording Device Using Infrared ID Sensor", Interaction 2003, Feb. 2003, pp. 237-238, with english translation thereof.
"Office Action of Japan Counterpart Application", dated Oct. 24, 2023, with English translation thereof, pp. 1-9.

\* cited by examiner

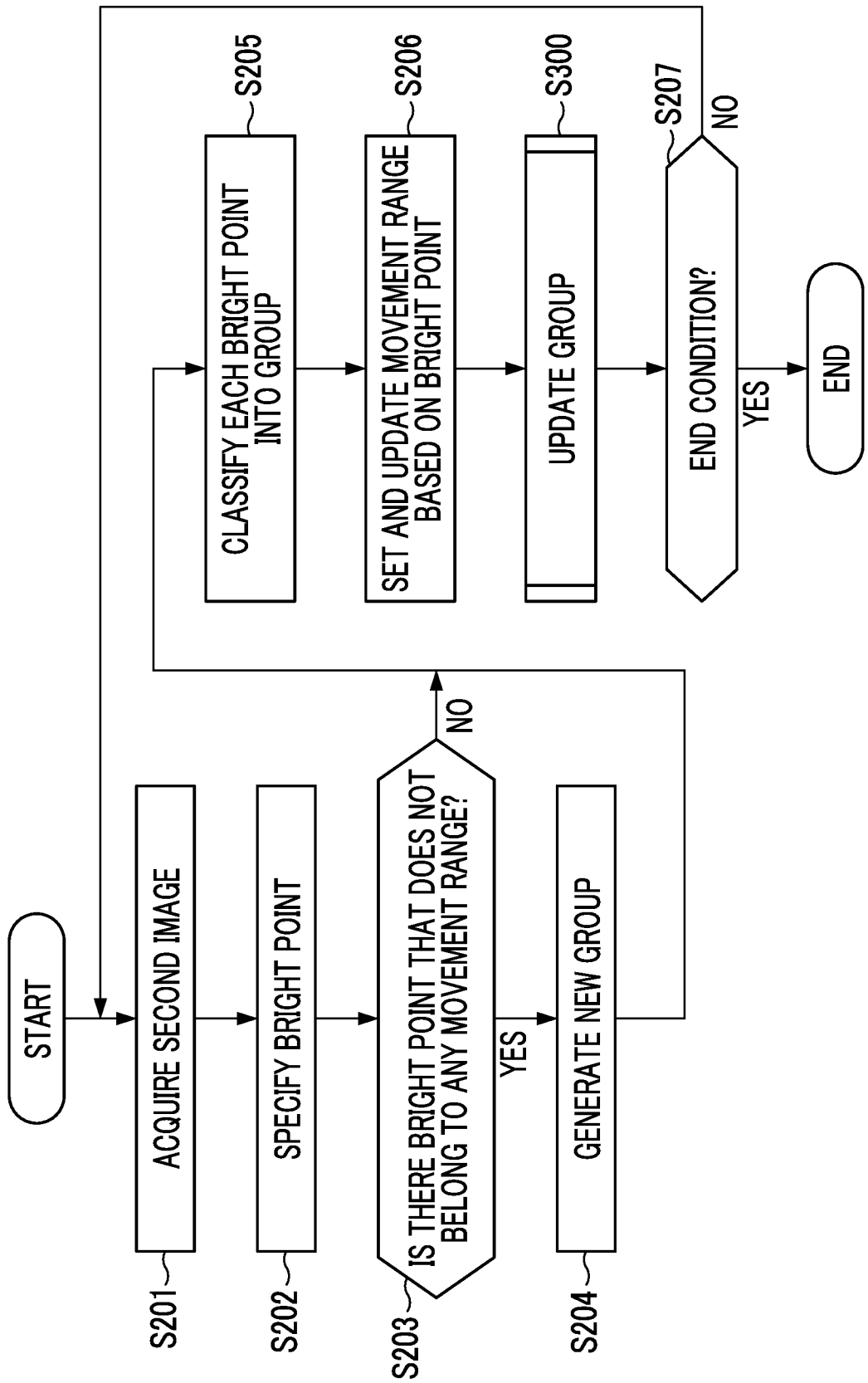

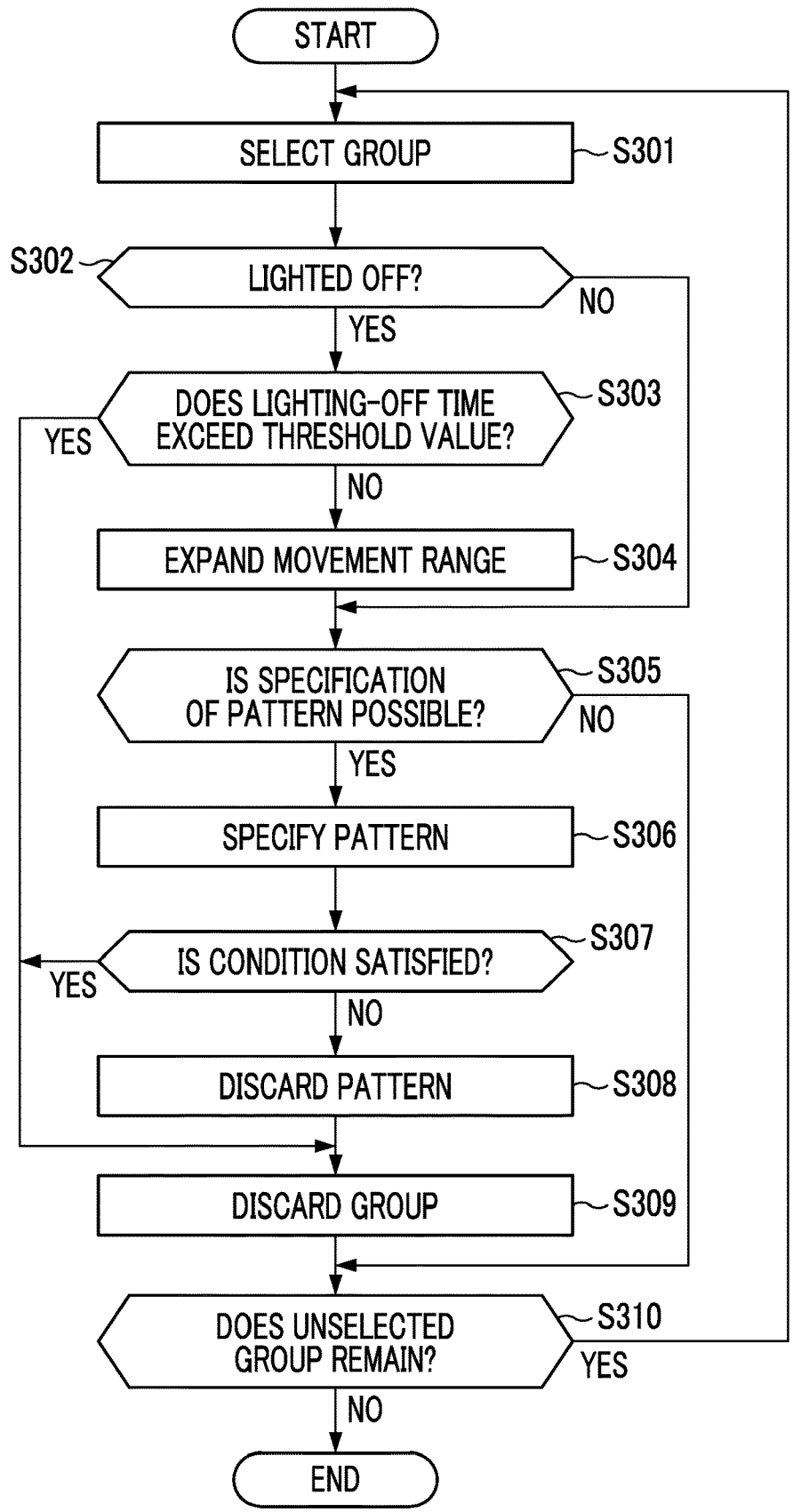

INFORMATION PROCESSING APPARATUS, LIGHTING DEVICE, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-207798 filed Nov. 18, 2019.

BACKGROUND

(i) Technical Field

The present invention relates to an information processing apparatus, a lighting device, and a non-transitory computer readable medium storing a program.

(ii) Related Art

There is a system in which a camera captures an image of a lighting tag and an information processing apparatus estimates a position of the tag based on information indicating lighting of the tag in the captured image. In the system, the lighting tag is attached to an item moving in a space and the camera periodically captures an image of the space. The information processing apparatus of the system grasps a position of the item from light of the tag included in the obtained image. The system is used, for example, in a factory or a warehouse to manage handling items.

In the system, the tag is repeatedly lighted on and off in a pattern corresponding to information to be transmitted. For this reason, the information processing apparatus cannot decode the information to be transmitted by the pattern unless images are collected until the pattern makes at least one cycle. However, the item to which the tag is attached is movable in the space, and the tag at the time of lighting-off cannot be distinguished from the surroundings. For this reason, the information processing apparatus easily loses track of the tag as the tag has a longer lighting-off time and a movement speed of the item is higher. A technique for keeping the track of the tag has been developed.

For example, JP2005-252399A discloses an optical tag system that sets a template area to surround a light point included in a camera image, sets a search area around the template area, searches the search area for each frame to hold information on an area having a template value closest to a template value of a target light point as a light point trajectory, determines whether there is a light point having a value equal to or larger than a threshold value in a range indicated by the light point trajectory, respectively holds a first value in a case where determination is made that there is the light point having the value equal to or larger than the threshold value and a second value in a case where determination is made that there is no light point having the value equal to or larger than the threshold value, and decodes the held first value and second value to recognize an ID.

JP2015-177262A discloses an imaging device that detects a time-varying light change area included in an image captured by a digital camera, detects a position of the light change area in the image, searches for a local area having a large feature amount in image processing in a predetermined range based on the position to track a movement thereof.

A positioning method using an optical beacon that blinks at a high speed with respect to a movement speed of a target object and a high-speed dedicated camera that captures the optical beacon is disclosed in IDCam: An image sensor capable of simultaneously acquiring a scene and an ID; Nobuyuki Matsushita, Daisuke Hihara, Teruyuki Ushiro, Shinichi Yoshimura, and Junichi Rekimoto, Interaction 2002, pp. 9-16 or An installation/wearable interaction recording device using an infrared ID sensor; Sadanori Ito, Yasuyuki Sumi, and Kenji Mase, Interaction 2003, pp. 237-238.

SUMMARY

The "tag tracking systems" may be able to perform high-accuracy tag tracking, with relatively high spatial resolution and by performing template matching. However, in a case where the spatial resolution is increased or the template matching is performed, the monetary cost or the cost of calculation amount for processing increases in the systems.

Aspects of non-limiting embodiments of the present disclosure relate to an information processing apparatus, a lighting device, and a non-transitory computer readable medium storing a program that specifies information to be transmitted by a plurality of lighting devices moving in a predetermined space with a lighting pattern, for example, using an imaging device in which the number of times of imaging per second is 100 or less.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to acquire, among a plurality of images obtained by periodically capturing one or more lighting devices that repeat blinking according to a determined pattern, a first image and a second image in which a lighted lighting device is captured and in response to a distance from a position of the device indicated by the first image to a position of the device indicated by the second image being within a range corresponding to a period from a time of capturing the first image to a time of capturing the second image, regard the lighting device indicated by the first image and the lighting device indicated by the second image are the same, and specify the pattern of the lighting device that has been regarded the same.

BRIEF DESCRIPTION OF THE DRAWINGS

Exemplary embodiment(s) of the present invention will be described in detail based on the following figures, wherein:

FIG. 7 is a diagram showing an example of a flow of an operation of specifying the tags 2 to be regarded as identical to each other;

FIG. 8 is a diagram showing an example of a flow of an operation of updating a group;

DETAILED DESCRIPTION

Exemplary Embodiment

Configuration of Information Processing System

Figure 1:
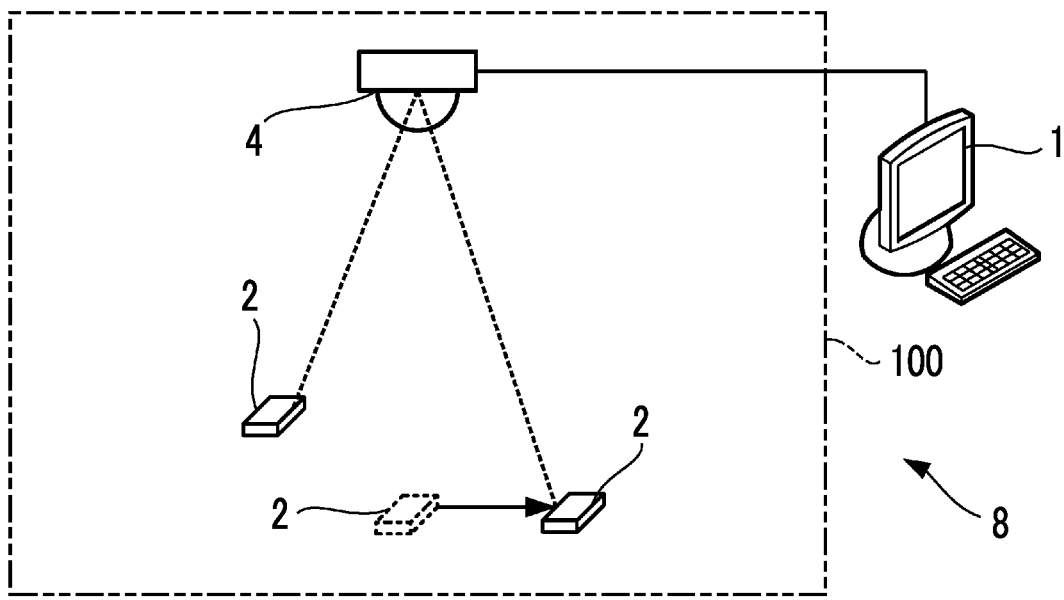
FIG. 1 is a diagram showing an example of the overall configuration of an information processing system 8.

FIG. 1 is a diagram showing an example of the overall configuration of an information processing system 8. The information processing system 8 has an information processing apparatus 1, a tag 2, and an imaging device 4.

The information processing apparatus 1 is an apparatus for performing information processing and is, for example, a personal computer, a smartphone, a slate PC, or a tablet PC.

The tag 2 is an example of a lighting device. The tag 2 is attached to an item that is movable in a space 100 and transmits information in a case where a light 23 described below lights up. In the information processing system 8, a case is assumed in which a plurality of tags 2 exist in one space 100. Here, the space 100 is, for example, a space in a building such as a factory or a warehouse, and the item is, for example, a tool used and managed in the factory, a workpiece, a product stored in the warehouse, or a piece of evidence. The item includes clothing or a hat worn by a person, a name tag, an armband, glasses, a wearable terminal, and the like. The tag 2 moves in the space 100 as the item to which the tag 2 is attached is conveyed or a worker or the like wearing the item moves.

The imaging device 4 is a digital video camera or the like that is installed in the space 100 and periodically images the space 100. The imaging device 4 is communicably connected to the information processing apparatus 1 by wire or wirelessly. A moving image captured by the imaging device 4 is configured of a plurality of images periodically captured. The plurality of images are respectively transmitted to the information processing apparatus 1.

The information processing apparatus 1 and the imaging device 4 may be connected by wire as shown in FIG. 1, by short-range wireless communication compliant with a standard such as IEEE 802.15, or through a communication line such as a local area network (LAN), a wide area network (WAN), and the Internet.

Configuration of Information Processing Apparatus

Figure 2:
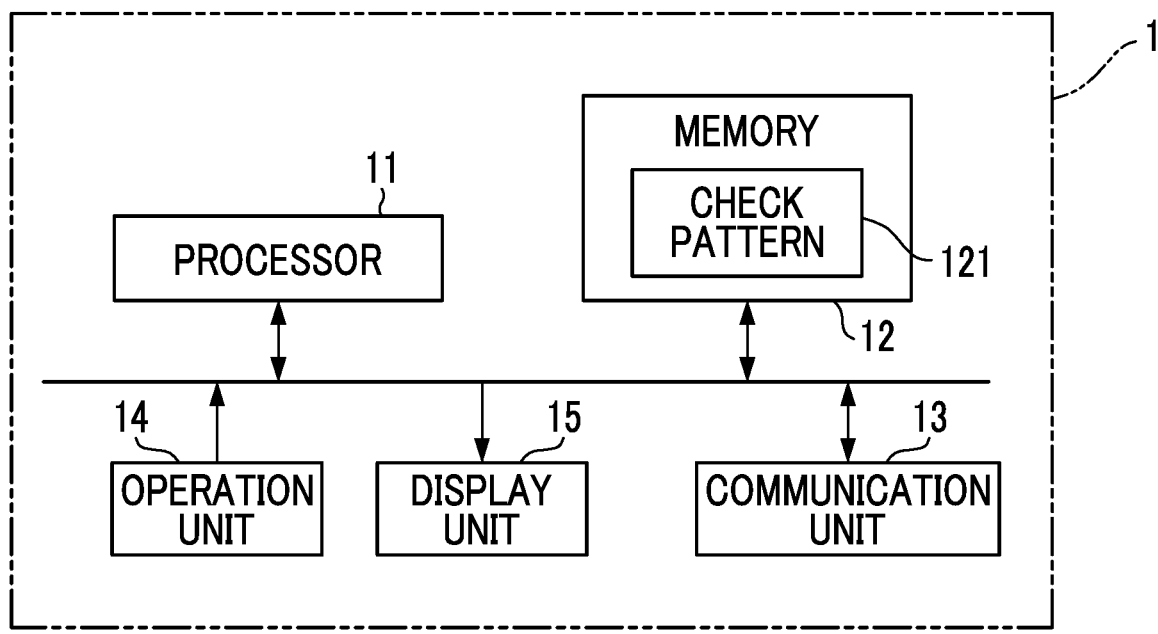
FIG. 2 is a diagram showing an example of a configuration of an information processing apparatus 1.

FIG. 2 is a diagram showing an example of a configuration of the information processing apparatus 1. The information processing apparatus 1 shown in FIG. 2 has a processor 11, a memory 12, a communication unit 13, an operation unit 14, and a display unit 15. The components are communicably connected to each other by, for example, a bus.

The processor 11 reads and executes a computer program (hereinafter simply referred to as a program) stored in the memory 12 to control each part of the information processing apparatus 1. The processor 11 is, for example, a central processing unit (CPU).

The communication unit 13 is a communication circuit that communicably connects the information processing apparatus 1 to another device by wire or wirelessly. The communication unit 13 shown in FIG. 2 directly connects the information processing apparatus 1 and the imaging device 4 by wire as shown in FIG. 1.

The operation unit 14 includes operators such as an operation button, a keyboard, a touch panel, and a mouse for performing various instructions, receives an operation, and transmits a signal corresponding to a content of the operation to the processor 11. The operation is, for example, a press on the keyboard or a gesture on the touch panel.

The display unit 15 has a display screen such as a liquid crystal display and displays an image under control of the processor 11. A transparent touch panel of the operation unit 14 may be disposed on the display screen in an overlapped manner. The information processing apparatus 1 may not have the operation unit 14 and the display unit 15. The information processing apparatus 1 may be operated from an external device through the communication unit 13 or may present information to the external device.

The memory 12 is a storage means that stores an operating system, various programs, data, and the like read by the processor 11. The memory 12 has a random access memory (RAM) or a read only memory (ROM). The memory 12 may have a solid state drive, a hard disk drive, or the like.

The memory 12 stores a check pattern 121. The check pattern 121 is a pattern set in advance that is required to be included in a pattern represented by blinking of the tag 2. The pattern set in advance is, for example, a pattern representing the head or end of a series of meaningful blink patterns. The processor 11 specifies a blinking tag 2 from the plurality of images acquired from the imaging device 4 through the communication unit 13 and analyzes a pattern represented by the blinking of the tag 2. The processor 11 collates the analyzed pattern with the check pattern 121 to determine whether or not the analyzed pattern is the pattern represented by the tag 2.

Tag Configuration

Figure 3:
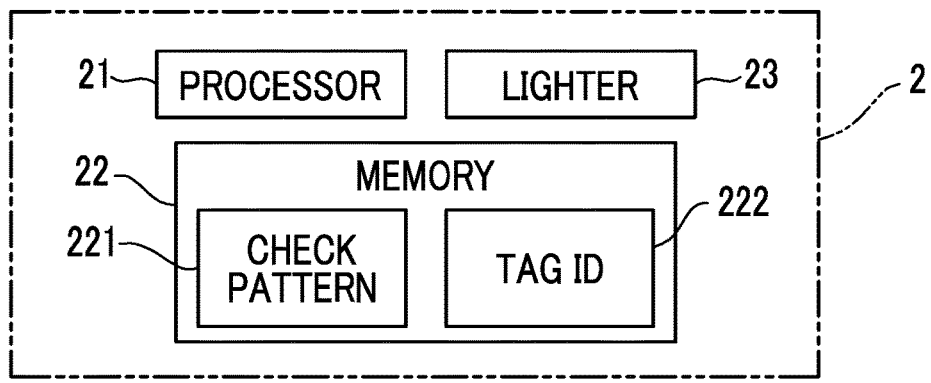
FIG. 3 is a diagram showing an example of a configuration of a tag 2.

FIG. 3 is a diagram showing an example of a configuration of the tag 2. The tag 2 has a processor 21, a memory 22, and a light 23.

The processor 21 reads and executes the program stored in the memory 22 to control each part of the tag 2. The processor 21 is, for example, a CPU.

The memory 22 is a storage that stores an operating system, various programs, data, and the like read by the processor 11. The memory 22 has a RAM and a ROM.

The memory 22 stores a check pattern 221 and a tag ID 222. The check pattern 221 is a pattern set in advance to be included in the pattern represented by the blinking of the tag 2 and is a pattern common to the above check pattern 121. The tag ID 222 is identification information for identifying the tag 2 and represents the identification information in a blinking pattern. A unique tag ID 222 is assigned to each tag 2.

The processor 21 reads the check pattern 221 and the tag ID 222 from the memory 22, generates a pattern including the check pattern 221 and the tag ID 222, and cause the light 23, such as a light emitting element, to blink. Thus, the tag 2 has the light 23, the processor 21, and the memory 22 that stores the predetermined check pattern 221. The pattern in which the processor 21 causes the light 23 to blink includes the check pattern 221 and the tag ID 222 unique to the tag 2.

In the pattern, an order of the check pattern 221 and the tag ID 222 is not limited. However, an order may be employed in which the check pattern 221 appears immediately before or immediately after the tag ID 222.

An information amount of the series of meaningful patterns is not limited, but is, for example, a fixed length of 16-bit. In the case, for example, the information amount of the tag ID 222 is 11-bit, and individuals of 2048 tags can be identified. The information amount of the check pattern 221 is 5-bit. The information amount of the tag ID 222 may be different for each content, and the pattern may be encoded by a variable length code.

The light 23 is a light emitting element or the like that emits light (that is, lights) under control of the processor 21 and is, for example, a light emitting diode (LED). A timing or length of lighting of the light 23 are controlled by the processor 21. Light emitted from the light 23 may be visible light or ultraviolet light. In the present exemplary embodiment, a description will be made using infrared light. In the exemplary embodiment, the light emitted from the light 23 is near-infrared light having a center wavelength of 880 nanometers.

In a case where the processor 21 lights the light 23, the processor 21 executes processing of lighting the light 23 for a determined time (also referred to as a first time) or more such that the information processing apparatus 1 recognizes the lighting.

The first time is, for example, an exposure time of the imaging device 4. In the case, the processor 21 executes processing of lighting the light 23 for a time equal to or larger than the exposure time. Accordingly, the processor 21 lights the light 23 during the exposure of the imaging device 4 even though a timing of the exposure and the timing of the lighting are shifted. In the case, the processor 21 blinks the light according to a pattern corresponding to the identification information for identifying the tag 2 itself. In a case where the processor 21 lights the light according to the pattern, the processor 21 lights the light for the exposure time of the imaging device that images the tag 2 itself. The exposure time of the imaging device 4 is naturally shorter than an imaging time per frame determined from a frame rate of the imaging device 4.

Configuration of Imaging Device

Figure 4:
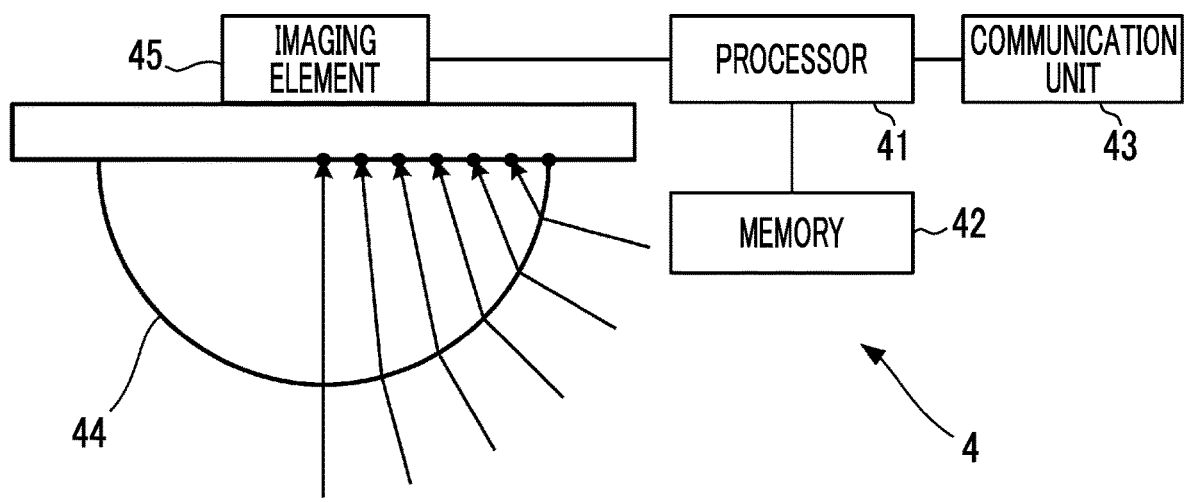
FIG. 4 is a diagram showing an example of a configuration of an imaging device 4.

FIG. 4 is a diagram showing an example of a configuration of the imaging device 4. The imaging device 4 has a processor 41, a memory 42, a communication unit 13, a fisheye lens 44, and an imaging element 45.

The processor 41 reads and executes a program stored in the memory 42 to control each part of the imaging device 4. The processor 41 is, for example, a CPU.

The memory 42 is a storage means that stores an operating system, various programs, data, and the like read by the processor 41. The memory 42 has a RAM or a Video RAM (VRAM) and a ROM. The memory 42 may have a solid state drive, a hard disk drive, or the like.

The communication unit 43 is a communication circuit that communicably connects the imaging device 4 to another device by wire or wirelessly. The communication unit 43 shown in FIG. 4 directly connects the information processing apparatus 1 and the imaging device 4 by wire as shown in FIG. 1.

The fisheye lens 44 is a lens directed to the space 100, captures light from the space 100 by a method such as an equidistant projection method, an equal solid angle projection method, or an orthographic projection method, and collects the light on the imaging element 45. The fisheye lens 44 shown in FIG. 4 has an angle of view of 180 degrees and captures the light from the space 100 by the equidistant projection method.

The imaging element 45 converts the light captured by the fisheye lens 44 into an electric signal under control of the processor 41. The imaging element 45 is, for example, a charge coupled device (CCD) image sensor or a complementary metal oxide semiconductor (CMOS) image sensor. The processor 41 controls the imaging element 45 to generate image data from the electric signal and stores the generated image data in the memory 42. The processor 41 transmits the image data stored in the memory 42 to the information processing apparatus 1 through the communication unit 43.

In the exemplary embodiment, the image data generated by the imaging element 45 is configured of, for example, 480×480 pixels, and each pixel represents intensity of the received infrared light in, for example, 256 gradations. In the case, for example, an average value of lengths corresponding to one pixel on the circumference 5 meters away from the imaging device 4 is approximately $5 \times \pi/480 \approx 0.033$ meters (that is, 33 millimeters) since the angle of view of 180 degrees corresponds to 480 pixels. That is, the imaging device 4 has a resolution of approximately 33 millimeters at a distance of 5 meters.

The imaging device 4 periodically images the space 100 a plurality of times. The number of times that the imaging device 4 of the information processing system 8 performs imaging in one second is 100 times or less. That is, the frame rate of the imaging device 4 is at most 100 frames per second (fps). The frame rate of the imaging device 4 shown in FIG. 4 is 25 fps. In a case where the imaging is performed at the frame rate of 25 fps, a time per frame is 40 milliseconds. The imaging device 4 transmits a plurality of images captured at different times to the information processing apparatus 1.

Functional Configuration of Information Processing Apparatus

Figure 5:
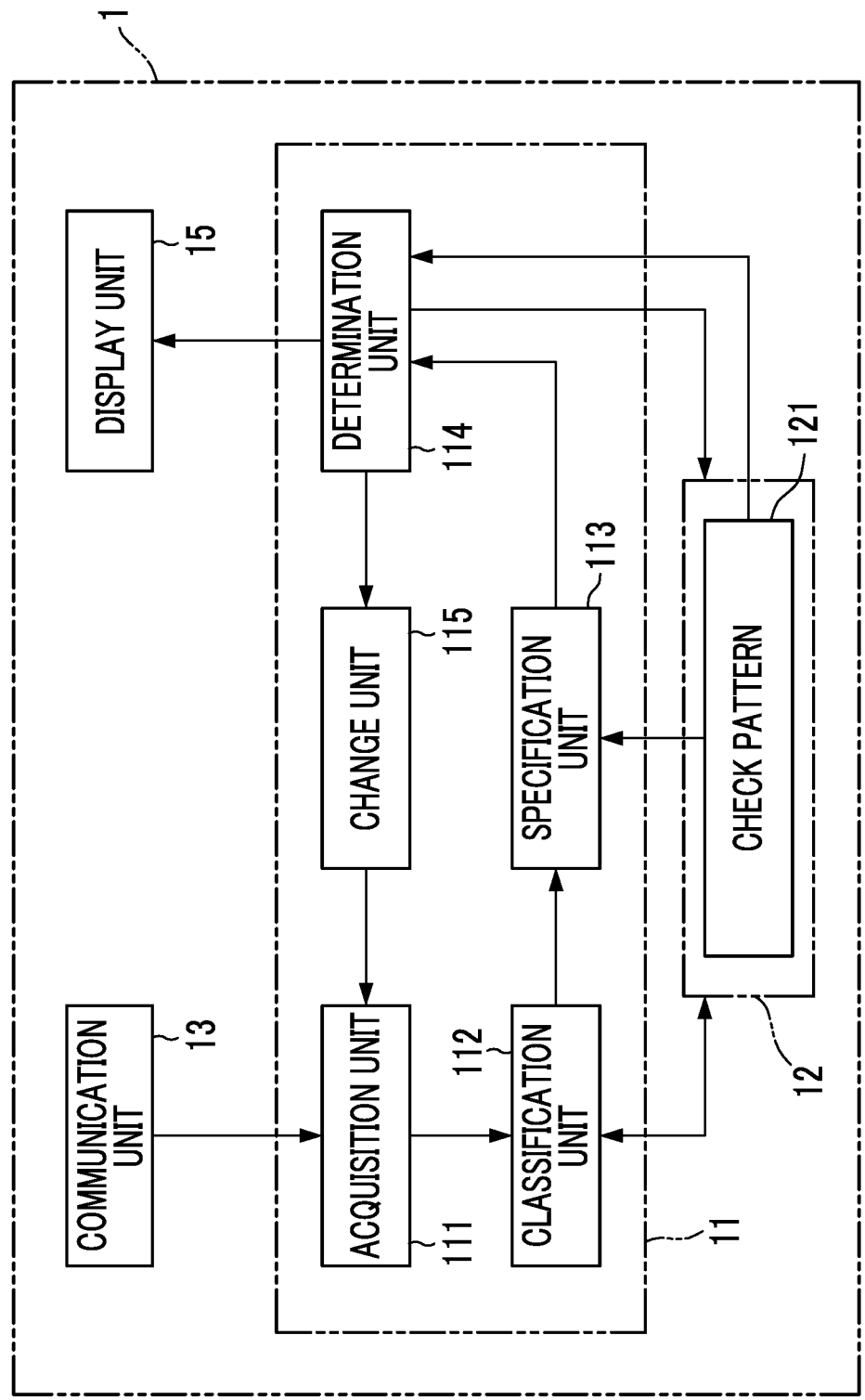
FIG. 5 is a diagram showing an example of a functional configuration of the information processing apparatus 1.

FIG. 5 is a diagram showing an example of a functional configuration of the information processing apparatus 1. The information processing apparatus 1 functions as an acquisition unit 111, a classification unit 112, a specification unit 113, a determination unit 114, and a change unit 115 by causing the processor 11 to execute the program stored in the memory 12.

The acquisition unit 111 acquires image data representing a plurality of images from the imaging device 4 (not shown in FIG. 5) through the communication unit 13. The image data indicates a plurality of images of the space 100 captured by the imaging device 4 at a frame rate of 25 fps, for example. As described above, in the space 100, there are the plurality of movable tags 2, each of which repeatedly blinks according to a determined pattern.

The acquisition unit 111 examines each of the plurality of acquired image data and extracts image data, from the plurality of image data, indicating an image in which a lighting tag 2 is captured.

Whether or not the lighting tag 2 is captured in the image is determined, for example, by comparing brightness of a plurality of pixels constituting the image and extracting a pixel group with pixel brightness that exceeds a threshold value compared with surrounding brightness. The pixel group is a set of one or more continuous pixels and is also referred to as a "bright point".

The acquisition unit 111 may compare an image captured at a certain timing with an image captured at the next timing to determine whether or not the lighting tag 2 is captured based on a change in the brightness of each pixel. That is, the acquisition unit 111 determines whether or not there is a pixel group in which the change in brightness exceeds the threshold value in two images that are continuously captured. In a case where determination is made that there is the pixel group, the acquisition unit 111 specifies the pixel group with higher brightness of the pixel groups as the bright point. The acquisition unit 111 acquires an image including the specified bright point as an image in which the lighting tag 2 is captured.

As described above, the acquisition unit 111 shown in FIG. 5 compares contents of the two images, that is, two frames with a continuous imaging timing and acquires any one (for example, image having earlier imaging time point) of the two images in a case where a condition is satisfied as the image in which the lighting tag 2 is captured. The acquisition unit 111 acquires an image captured earlier by the imaging device 4 as a first image and acquires an image captured later than the first image as a second image.

In a case where an image is acquired for every two frames as described above, 1-bit information is acquired in a time corresponding to the two frames. That is, in a case where an image obtained by capturing the lighting tag 2 for the time of two frames is acquired, the corresponding 1-bit information is, for example, "1". In a case where the image is not acquired, the corresponding 1-bit information is, for example, "0".

The classification unit 112 generates a group in the memory 12 for collectively handling a plurality of images in which tags 2 required to be regarded as identical to each other are captured. The classification unit 112 first classifies the first image acquired by the acquisition unit 111 into the generated group.

The classification unit 112 specifies a position of the tag 2 indicated by each of the first image and the second image in the space 100. For example, the equidistant projection method is employed for the image captured by the imaging device 4 shown in FIG. 4. Therefore, a distance from the center in the image corresponds to a direction in which light enters the imaging device 4. The classification unit 112 calculates a distance between the bright point specified in the image and the center of the image, converts the distance into an angle, and specifies a direction of the lighting tag 2 with respect to the imaging device 4. Further, the classification unit 112 specifies each position of the tag 2 in the space 100 based on the direction of the tag 2 specified in each of the first image and the second image.

The classification unit 112 calculates a distance in the space 100 from the position of the tag 2 indicated by the first image to the position of the tag 2 indicated by the second image to determine whether or not the distance is within a range corresponding to a period from a time of capturing the first image to a time of capturing the second image. Here, for example, in a case where the imaging device 4 captures an image at the frame rate of 25 fps and the information processing apparatus 1 determines "whether or not the image is a lighting image" for each of two continuous frames of images, the "period from the time of capturing the first image to the time of capturing the second image" is 80 milliseconds at the minimum corresponding to the two frames.

In a case where the period is 80 milliseconds, the tag 2 in the space 100 is not lighted off from the time of capturing the first image to the time of capturing the second image. In a case where there is a time during which all the tags 2 are lighted off from the time of capturing the first image to the time of capturing the second image, the period is increased by 80 milliseconds according to a length of the time. In a case where determination is made that the calculated distance is not within the above range, the classification unit 112 does not classify the second image into the group into which the first image is classified.

On the other hand, in a case where determination is made that the calculated distance is within the range corresponding to the above period, the classification unit 112 classifies the second image into the group into which the first image is classified.

The "range corresponding to the period" indicates a range in which the tag 2 is movable during the period (hereinafter also referred to as a movement range). That is, in a case where determination is made that the above distance is within the range corresponding to the above period, the tag 2 captured in the second image is within the range in which the tag 2 captured in the first image is movable. Therefore, in a case where the determination is made, the tags 2 indicated by the first image and the second image are required to be regarded as identical to each other.

The specification unit 113 specifies, using information of images classified into a common group by the classification unit 112, a pattern represented by blinking of the tag 2. The tags 2 that are lighted on and required to be regarded as identical to each other are captured in the images classified into the common group. The specification unit 113 specifies, using the timing at which each of the images classified into the common group is captured, the pattern represented by the blinking of the tags 2 to be regarded as identical to each other by the images.

The determination unit 114 determines whether or not the pattern specified by the specification unit 113 satisfies a determined condition. The determination unit 114 shown in FIG. 5 reads the check pattern 121 from the memory 12 and determines whether or not the pattern specified by the specification unit 113 includes the check pattern 121.

In a case where determination is made that the pattern specified by the specification unit 113 includes the check pattern 121, the determination unit 114 stores the specified pattern in the memory 12 in correspondence with the tags 2 to be regarded as identical to each other in the above group.

On the other hand, in a case where determination is made that the pattern specified by the specification unit 113 does not include the check pattern 121, the determination unit 114 notifies the change unit 115 of the determination. The change unit 115 discards the pattern that the determination unit 114 determines not to include the check pattern 121 and changes the first image classified into the group corresponding to the pattern to another image which is captured by the imaging device 4 and in which the lighting tag 2 is captured. The acquisition unit 111 acquires the first image changed by the change unit 115.

Here, "check pattern 121 is included" is an example of the determined condition for the pattern specified by the specification unit 113. The above condition may be other than the condition that the check pattern 121 is included. For example, a condition using error detection of a checksum, a cyclic code, a parity code, or the like calculated from the specified pattern, or a hash value may be employed.

Operation of Information Processing Apparatus

Figure 6:
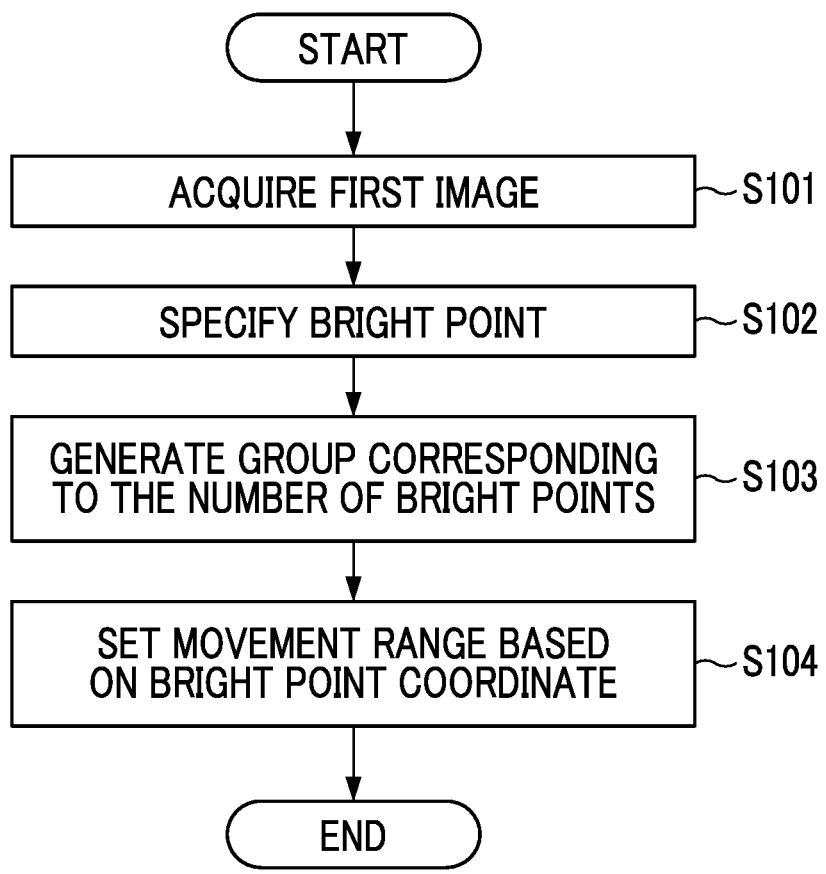
FIG. 6 is a diagram showing an example of a flow of an operation of detecting the tag 2 from a first image.
Figure 9A:
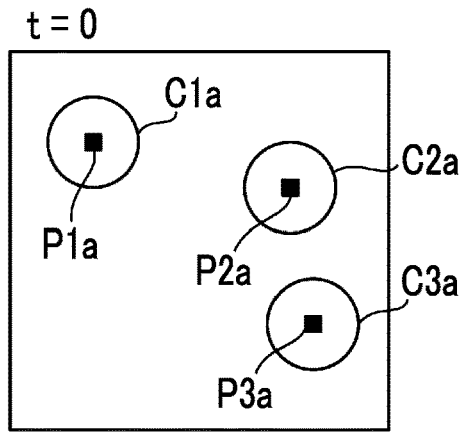
FIG. 9 is a diagram for describing a process in which positions and identification information of tags 2 are specified.
Figure 9B:
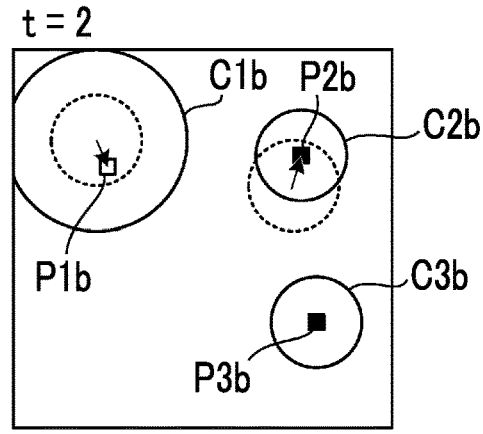
Figure 9C:
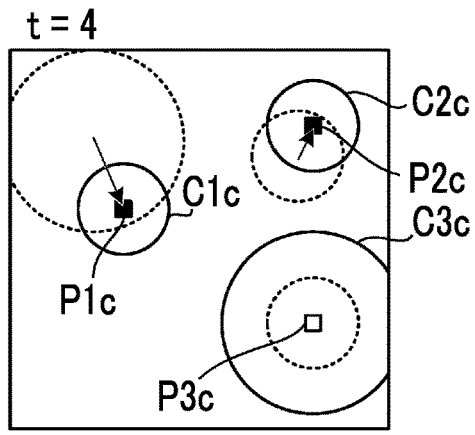
Figure 9D:
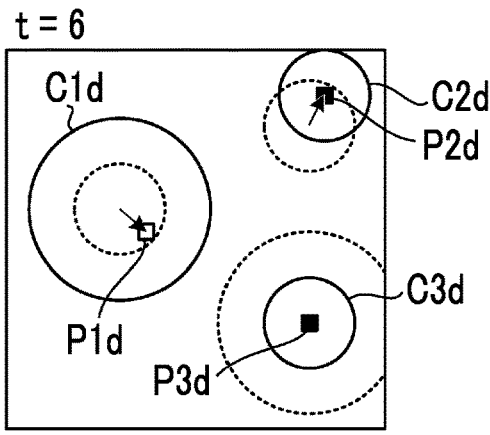

FIG. 6 is a diagram showing an example of an operation flow in which the information processing apparatus 1 detects the tag 2 from the first image. The processor 11 of the information processing apparatus 1 acquires the first image from the imaging device 4 (step S101) and specifies the bright point included in the first image (step S102).

Next, the processor 11 generates one or more groups corresponding to the number of specified bright points (step S103). The generated group is stored in the memory 12 in correspondence with the bright point specified in the first image.

Next, the processor 11 sets the movement range of the tag 2 indicated by the bright point based on a coordinate of the specified bright point in the first image (referred to as bright point coordinate) (step S104).

In step S104, the processor 11 converts, for each bright point corresponding to each group generated in step S103, the bright point coordinates into positions of the tag 2 in the space 100. The processor 11 calculates a sphere having the specified position as the center and a radius equal to a determined distance (hereinafter referred to as a unit distance), sets the inside of the sphere as the movement range of the tag 2 indicated by the bright point, and stores the setting in the memory 12. In a case where the movement of the tag 2 is restricted within a plane, the above sphere is replaced by a circle intersecting the plane.

Here, the unit distance refers to the maximum distance that the tag 2 is movable at a determined time (hereinafter referred to as a unit time). The unit time refers to the minimum time of a time difference between the time of capturing the first image and the time of capturing the second image to be captured after the first image. As described above, for example, in the case where the imaging device 4 captures an image at the frame rate of 25 fps and the information processing apparatus 1 determines "whether or not the image is a lighting image" for each of two continuous frames of images, the unit time is 80 milliseconds corresponding to the two frames.

For example, the memory 12 stores an upper limit of a speed at which the tag 2 is movable (referred to as a movable speed). The processor 11 calculates the unit distance by multiplying the movable speed stored in the memory 12 by the unit time described above.

In a case where the imaging device 4 captures a moving image at the frame rate of 25 fps, the time per frame is 40 milliseconds as described above. Ina case where the processor 11 acquires one image from two continuous frames in the moving image, the minimum time difference from the time of capturing the first image to the time of capturing the second image is a time corresponding to the two frames, that is, 80 milliseconds. That is, the unit time is 80 milliseconds.

In a case where the tag 2 is attached to an item worn by a person such as a worker, the movable speed of the tag 2 is the upper limit of the movement speed of the person. For example, in a case where 1.2 meters per second is stored in the memory 12 as the upper limit of the movement speed of the person, the processor 11 calculates the unit distance as 0.096 meters (that is, 96 millimeters) using the unit time of 80 milliseconds and the upper limit of the movement speed of the person of 1.2 meters per second. In the case, the processor 11 sets a sphere or a circle, with the position of the tag 2 specified from the bright point coordinate as the center, having a radius of 0.096 meters as a range within which the tag 2 is movable in the unit time of 80 milliseconds (that is, movement range).

FIG. 7 is a diagram showing an example of a flow of an operation of specifying the tags 2 to be regarded as identical to each other in the first image and the second image. The processor 11 acquires the second image captured after the first image from the imaging device 4 (step S201) and specifies the bright point included in the second image (step S202).

Next, the processor 11 determines whether or not there is a bright point that does not belong to any movement range set in step S104 among the bright points specified from the second image (step S203).

In a case where determination is made that there is the bright point that does not belong to any movement range among the bright points specified from the second image (step S203; YES), the processor 11 generates a new group corresponding to the bright point (step S204) and proceeds the processing to step S205.

On the other hand, in a case where determination is made that the bright point specified from the second image does not include a bright point that does not belong to any movement range (step S203; NO), the processor 11 proceeds the processing to step S205 without performing step S204.

Next, the processor 11 classifies each bright point into a group to which each bright point belongs (step S205) and sets or updates the movement range of each bright point based on the classified bright points (step S206). The processor 11 executes processing of updating the group (step S300).

FIG. 8 is a diagram showing an example of a flow of an operation of updating a group. Step S300 described above is configured of each step from step S301 to step S310 shown in FIG. 8.

The processor 11 selects one group from one or more groups that are generated and not discarded up to this point in time (step S301) and determines whether or not the tag 2 corresponding to the selected group is lighted off (step S302).

In a case where determination is made that the tag 2 corresponding to the selected group is not lighted off (step S302; NO), the processor 11 proceeds the processing to step S305 described below without performing steps S303 and S304.

On the other hand, in a case where determination is made that the tag 2 corresponding to the selected group is lighted off (step S302; YES), the processor 11 determines whether or not a time during which the tag 2 continues to be lighted off, that is, a period from lighting-off of the light 23 to lighting of the light 23 next time by the processor 21 of the tag 2 (lighting-off time) exceeds a threshold value (step S303).

In a case where determination is made that the lighting-off time of the tag 2 exceeds the threshold value (step S303; YES), the processor 11 proceeds the processing to step S309 described below without performing steps S304 to S306.

On the other hand, in a case where determination is made that the lighting-off time of the tag 2 does not exceed the threshold value (step S303; NO), the processor 11 expands the movement range of the tag 2 corresponding to the selected group (step S304). For example, the processor 11 sets a new movement range by adding the above unit distance of 0.096 meters to the radius of the movement range of the group to expand the movement range of the tag 2.

Next, the processor 11 determines whether or not the specification of the pattern represented by the tags 2 to be regarded as identical to each other is possible, based on the images classified into the selected group (Step S305). In a case where the pattern has, for example, a fixed length, the processor 11 determines whether or not the specification of the pattern is possible, based on whether or not an elapsed time from a time of capturing an image first classified into the group exceeds a time corresponding to the fixed length.

Specifically, in a case where the above fixed length is 16 bits, a time corresponding to 32 frames, that is, 2.56 seconds elapses for 16-bit since a time corresponding to two frames elapses per 1-bit. That is, in a case where the elapsed time from the time of capturing the image first classified into the group exceeds 2.56 seconds, the processor 11 determines that the specification of the pattern is possible.

In a case where determination is made that the specification of the pattern is impossible (step S305; NO), the processor 11 proceeds the processing to step S310 described below without performing steps S306 to S309.

On the other hand, in a case where determination is made that the specification of the pattern is possible (step S305; YES), the processor 11 specifies the pattern (step S306) and determines whether or not the pattern satisfies the determined condition (step S307). The determined condition is, for example, that the specified pattern includes the check pattern 121 stored in the memory 12.

In a case where determination is made that the specified pattern does not satisfy the determined condition (step S307; NO), the processor 11 discards the pattern specified in step S306 (step S308), and proceeds the processing to step S309.

In step S308, the processor 11 may change the first image classified into the group to another image in which the lighting tag 2 is captured in addition to discarding the pattern. In the case, the processor 11 may perform step S308 and then proceed the processing to step S310 without performing step S309.

On the other hand, in a case where determination is made that the specified pattern satisfies the determined condition (step S307; YES), the processor 11 proceeds the processing to step S309 without performing step S308.

Next, the processor 11 discards the group selected in step S301 (step S309) and determines whether or not an unselected group remains (step S310).

As described above, in a case where determination is made in step S303 that the lighting-off time of the tag 2 exceeds the threshold value, the processor 11 proceeds the processing to step S309 and discards the group. The fact that the lighting-off time exceeds the threshold value means that the period from the time of capturing the first image to the time of capturing the second image classified into the above group exceeds the threshold value (determined time) and an image obtained by capturing the tag 2 indicated by the first image is not acquired during the period. The processor 11 discards the group to stop regarding the tags 2, respectively captured in the images classified into the group, as identical to each other. That is, the processor 11 is an example of a processor that does not regard the tags, respectively indicated by the first image and the second image, as identical to each other in a case where the period from the time of capturing the first image to the time of capturing the second image exceeds the determined time and an image obtained by capturing the tag indicated by the first image is not acquired during the period.

In a case where determination is made that an unselected group remains (step S310; YES), the processor 11 returns the processing to step S301. In step S301, the processor 11 selects one group from the unselected groups and repeats the above processing.

On the other hand, in a case where determination is made that there is no unselected group (step S310; NO), the processor 11 ends the processing.

After step S300, the processor 11 determines whether or not a condition for ending the processing (referred to as an end condition) is satisfied (step S207) as shown in FIG. 7. The end condition is, for example, a condition that the operation unit 14 receives an instruction from a user to end the processing.

In a case where determination is made that the end condition is satisfied (step S207; YES), the processor 11 ends the processing. On the other hand, in a case where determination is made that the end condition is not satisfied (step S207; NO), the processor 11 returns the processing to step S201.

By performing the operations described above, the information processing apparatus 1 in the information processing system 8 specifies the information transmitted by tag 2 using, for example, an imaging device in which the number of times of imaging per second is approximately 25 times even though the tag 2 moves in the space 100. That is, the information processing system 8 can acquire the information represented by the moving tag 2 without using a high-speed camera with a frame rate of 1000 fps. In the information processing system 8, the processor 11 of the information processing apparatus 1 does not need to perform complicated processing such as the template matching on the captured image, and thus costs are reduced compared with an apparatus that performs processing such as the template matching.

Operation Example

FIG. 9 is a diagram for describing a process in which positions and identification information of tags 2 are specified. A frame t is the number of images captured by the imaging device 4 (that is, the number of frames).

Apart (a) in FIG. 9 shows positions and movement ranges of tags 2 captured at the point in time of a frame t=0. There are three tags 2 shown in the part (a) in FIG. 9, which are respectively disposed at positions P1*a*, P2*a*, and P3*a*. At the time, the processor 11 sets a movement range C1*a* with the position P1*a* as the center, a movement range C2*a* with the position P2*a* as the center, and a movement range C3*a* with the position P3*a* as the center. The three movement ranges are circles having a radius of the unit distance.

In a case where the lighting tag 2 is captured in next two frames, the processor 11 acquires the image as the second image. Apart (b) in FIG. 9 shows positions and movement ranges of tags 2 captured at the point in time of a frame t=2. The tag 2 existing at the position P1*a* in the part (a) in FIG. 9 moves to a position P1*b* as shown in the part (b) in FIG. 9, but is lighted off. Therefore, since the processor 11 cannot specify the position P1*b*, the processor 11 expands the movement range C1*a* of the position P1*a* to a movement range C1*b*. The movement range C1*b* is a circle having a radius of twice the unit distance.

On the other hand, the tag 2 existing at the position P2*a* in the part (a) in FIG. 9 moves to a position P2*b* in the part (b) in FIG. 9 and is lighted. The position P2*b* in the part (b) in FIG. 9 is included in the movement range C2*a* in the part (a) in FIG. 9. The processor 11 updates the position P2*a* with the position P2*b* and sets a new movement range C2*b* with the position P2*b* as the center. The movement range is a circle having a radius of the unit distance.

The tag 2 existing at the position P3*a* in the part (a) in FIG. 9 exists at the position P3*b* in the part (b) in FIG. 9 and is lighted. The position P3*a* and the position P3*b* are the same position. That is, since the tag 2 is not moved, the position P3*b* in the part (b) in FIG. 9 is included in the movement range C3*a* in the part (a) in FIG. 9. In the case, the processor 11 also updates the position P3*a* with the position P3*b* and sets a new movement range C3*b* with the position P3*b* as the center. The movement range is a circle having a radius of the unit distance.

Apart (c) in FIG. 9 shows positions and movement ranges of tags 2 captured at the point in time of a frame t=4. The tag 2 existing at the position P1*b* in the part (b) in FIG. 9 moves to a position P1*c* as shown in the part (c) in FIG. 9 and is lighted again. The processor 11 updates the position P1*a* with the position P1*c* and sets a new movement range C1*c* with the position P1*c* as the center. The movement range is a circle having a radius of the unit distance.

On the other hand, the tag 2 existing at the position P2*b* in the part (b) in FIG. 9 moves to a position P2*c* in the part (c) in FIG. 9 and is lighted. The processor 11 updates the position P2*b* with the position P2*c* and sets a new movement range C2*c* with the position P2*c* as the center. The movement range is a circle having a radius of the unit distance.

The tag 2 existing at the position P3*b* in the part (b) in FIG. 9 exists at a position P3*c* in the part (c) in FIG. 9, but is lighted off. The position P3*b* and the position P3*c* are the same position. That is, the tag 2 does not move and is lighted off by the point in time of the frame t=4. Therefore, since the processor 11 cannot specify the position P3*c*, the processor 11 expands the movement range C3*b* of the position P3*b* to a movement range C3*c*. The movement range C3*c* is a circle having a radius of twice the unit distance.

The processor 11 of the information processing apparatus 1 specifies the position of the lighting tag 2 for every two frames and sets the movement range, with the specified position of the tag 2 as the center, in which the tag 2 is movable in the next two frames to repeatedly specify a trajectory of the tag 2 required to be regarded as identical to each other is repeated. In a case where the tag 2 is lighted off in a certain second frame, the position of the tag 2 is not specified. Therefore, the processor 11 expands the movement range. In a case where the position of the tag 2 to be specified in the next two frames is included in the movement range of each tag 2, the processor 11 regards the tags 2 as identical to each other and specifies a blinking pattern of the tag 2.

A part (d) in FIG. 9 shows positions and movement ranges of tags 2 captured at the point in time of a frame t=6. With repetition of the above processing, the processor 11 changes the movement range C1*c*, the movement range C2*c*, and the movement range C3*c* shown in the part (c) in FIG. 9 to a movement range C1*d*, a movement range C2*d*, and a movement range C3*d*, respectively. In the parts (a) to (d) in FIG. 9, the processor 11 specifies a pattern of "1"→"0"→"1"→"0" from the tag 2 existing at the position P1*a* in the part (a) in FIG. 9. The tag 2 exists at the position P1*b* in the part (b) in FIG. 9, at the position P1*c* in the part (c) in FIG. 9, and at the position P1*d* in the part (d) in FIG. 9, respectively.

In the parts (a) to (d) in FIG. 9, the processor 11 specifies a pattern of "1"→"1"→"1"→"1" from the tag 2 existing at the position P2*a* in the part (a) in FIG. 9. The tag 2 exists at the position P2*b* in the part (b) in FIG. 9, at the position P2*c* in the part (c) in FIG. 9, and at the position P2*d* in the part (d) in FIG. 9, respectively.

In the parts (a) to (d) in FIG. 9, the processor 11 specifies a pattern of "1"→"1"→"0"→"1" from the tag 2 existing at the position P3*a* in the part (a) in FIG. 9. The tag 2 exists at the position P3*b* in (b) of FIG. 9, at the position P3*c* in the part (c) in FIG. 9, and at the position P3*d* in the part (d) in FIG. 9, respectively.

Figure 10:
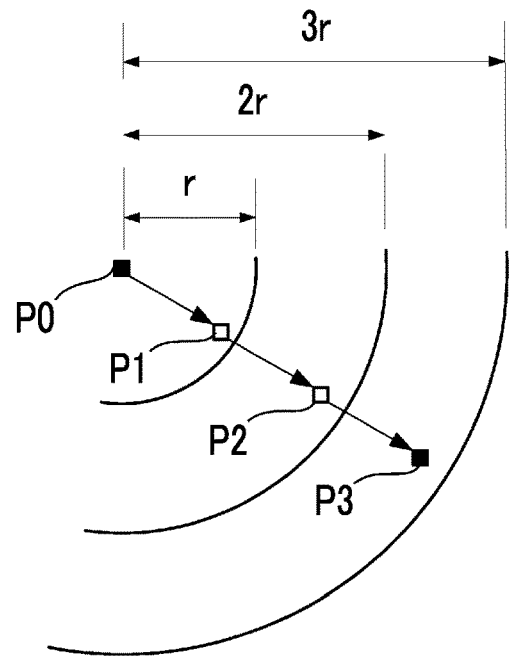
FIG. 10 is a diagram for describing a relationship between a lighting-off time and a movement range.

FIG. 10 is a diagram for describing a relationship between the lighting-off time and the movement range. The position P0 shown in FIG. 10 is an initial position of the lighting tag 2. The tag 2 moves from position P0→position P1→position P2→position P3 every time the unit time elapses. The tag 2 is lighted off in a case of existing at the positions P1 and P2 and lighted again in a case of moving to the position P3. That is, the tag 2 is lighted off for a period corresponding to 2-bit. In the case, the processor 11 expands the radius of the movement range to 3*r* with the unit distance as r. That is, a tag 2 having a continuous lighting-off time corresponding to (n)-bit requires a movement range having a radius of (n+1) times the unit distance.

On the other hand, the closer two or more tags 2 are to each other, the more likely the tags 2 are to enter a common movement range and be regarded as identical to each other. In particular, a possibility that different tags 2 enter the common movement range increases as an error in the accuracy of specifying the position of the tag 2 increases. For example, it is desirable that an upper limit may be set for an allowable movement range. The lighting-off time and the movement range have the above relationship. Therefore, the information processing system 8 controls the tag 2 such that the lighting-off time for which the tag 2 is continuously lighted off does not exceed a determined time (hereinafter also referred to as second time) to set the upper limit for the movement range.

For example, in a case where a distance between people is guaranteed not to be equal to or less than 0.4 meters at the minimum including a positioning error, the radius of the movement range may not exceed 0.4 meters. With this, two or more tags 2 moving with different people are not regarded as identical to each other. The information processing system 8 prevents the lighting-off time included in the pattern for blinking the tag 2 from exceeding the determined second time such that the radius of the movement range does not exceed 0.4 meters.

That is, in a case where the imaging device 4 captures an image at the frame rate of 25 fps and the information processing apparatus 1 acquires one image for every two frames, the unit time is 80 milliseconds as described above. As described above, in a case where 1.2 meters per second is stored in the memory 12 as the upper limit of the movement speed of the person, the unit distance is 0.096 meters. A value obtained by dividing the upper limit of the radius of the movement range by the unit distance is 0.4÷0.096=4.17. Therefore, the tag 2 is designed such that the continuous lighting-off time thereof does not exceed a time corresponding to (4−1)=3-bit, that is, 240 milliseconds which is three times of the unit time. Accordingly, the number of times the blinking tag 2 is lighted off according to a correct pattern is up to three times and does not exceed four times.

In the case, in step S303 described above, the processor 11 determines whether or not the lighting-off time exceeds 240 milliseconds which is the threshold value (that is, second time) to determine whether or not the pattern being specified is correct.

The movable speed of the tag 2 attached to the item worn by a person is equal to the upper limit of the movement speed of the person. Therefore, the processor 21 of the tag 2 blinks the light according to the pattern corresponding to the identification information for identifying the tag 2 itself. In a case where the processor 21 lights off the light continuously according to the pattern, the processor 21 lights off the light such that a period from lighting off the light to lighting the light next time does not exceed the second time determined according to the movable speed at which the tag 2 itself is movable.

For example, in a case where the processor 21 blinks the light 23 in a pattern in which the information amount is 16-bit, the processor 21 can transmit 65536 pieces of information at the maximum. However, in a case where a content of the check pattern 221 of 5-bit is fixed, the information that can be transmitted by the processor 21 is 2048 pieces corresponding to the tag ID 222 having the information amount of 11-bit. Further, as described above, in a case where the number of times the tag 2 is continuously lighted off in the pattern is limited to three times, the information represented by the tag 2 is less than 2048 pieces.

Modification Example

The above is the description of the exemplary embodiment, but the contents of the exemplary embodiment can be modified as follows. Further, the following modification examples may be combined.

<1>

In the above exemplary embodiment, the change unit 115 changes the first image classified into the group corresponding to the pattern determined not to include the check pattern 121 to another image which is captured by the imaging device 4 and in which the lighting tag 2 is captured. However, the first image may be changed to an image that is not used for specifying the above pattern. The processor 11 is an example of a processor that changes the first image to another image that is not used for specifying the pattern in a case where the pattern does not satisfy the condition. With the configuration, only one first image among the images used for specifying the pattern is sufficient for the image in which the processor 11 stores the position and the movement range of the tag 2 in the memory 12. That is, the processor 11 does not need to keep storing the position of the tag indicated by the image other than the first image used for specifying the pattern at least after the pattern is specified.

Another image used for specifying the pattern is an image captured after the first image and is an image for which the specification of the pattern is possible together with the first image. Therefore, even though the pattern is specified with another image used for specifying the pattern as a new first image, the correct pattern may not be specified. In the modification example, the processor 11 also suppresses the calculation load for specifying the pattern by excluding another image already used for specifying the pattern from candidates for the new first image.

<2>

In the above exemplary embodiment, the processor 11 sets or updates each of the movement ranges based on the bright point classified into the group. However, the movement range may not be updated every time the bright point is classified into the group. The processor 11 may not change the center of the movement range of the tag 2 indicated by the first image classified into the group.

In the above exemplary embodiment, in a case where the bright point specified from the acquired second image belongs to the movement range of the tag 2 corresponding to any of the groups, the processor 11 updates the movement range thereof based on a new bright point. Here, in a case where an image acquired in step S201 in a second time is referred to as a third image, the third image is an image which is captured after the second image acquired in step S201 in a first time is captured and in which the lighting tag 2 is captured.

In step S206 in the first time, the movement range is updated with a position of the tag 2 indicated by the second image acquired in step S201 in the first time as the center. Therefore, in step S205 in the second time, the processor 11 classifies a bright point specified in the third image into the group into which the first image and the second image are classified, in a case where a distance from the position of the tag 2 indicated by the second image to a position of the tag 2 indicated by the third image is within a range corresponding to a period from the time of capturing the second image to a time of capturing the third image. Accordingly, the tags 2 indicated by the first image, the second image, and the third image are regarded as identical to one another in correspondence with the group, and the pattern based on the tag 2 is specified.

That is, the processor 11 according to the above exemplary embodiment is an example of a processor in which the third image obtained by capturing the lighting tag is acquired after the second image is captured and the tags indicated by the first image, the second image, and the third image are regarded as identical to one another and the pattern based on the tags is specified, in a case where a distance from the position of the tag indicated by the second image to the position of the tag indicated by the third image is within a range corresponding to the period from the time of capturing the second image to the time of capturing the third image.

<3>

In the above exemplary embodiment, the number of times that the processor 21 of the tag 2 blinks the light 23 according to the determined pattern is not particularly limited. However, the processor 21 may repeatedly blink the light according to the above pattern. In the case, the processor 21 may blink the light 23 once according to the determined pattern, then light off the light 23 for the lighting-off time exceeding the second time, and then repeatedly blink the light 23 according to the pattern again.

In the configuration, in a case where the information processing apparatus 1 detects a lighting-off time exceeding the second time, the lighting-off time is not a time in the middle of the tag 2 blinking according to the pattern, but is a time between the patterns that are repeatedly represented. Therefore, in a case where the lighting-off time exceeding the second time is detected, the processor 11 may acquire an image obtained by capturing the lighting tag 2 after the detection as a new first image and generate a group corresponding to the number of bright points shown in the first image.

The processor 21 of the above tag 2 according to the modification example is an example of a processor that blinks the light according to the determined pattern, then continuously lights off the light for the lighting-off time exceeding the second time, and then repeatedly blinks the light according to the pattern.

<4>

In the above exemplary embodiment, the processor 21 of the tag 2 blinks the light 23 according to the pattern including the check pattern 221 and the tag ID 222. However, the information included in the pattern is not limited thereto. The processor 21 may include, for example, data indicating a measured physical quantity or a received signal in the tag 2 in the above pattern.

<5>

The information processing apparatus 1 described above has the processor 11, but a control means for controlling the information processing apparatus 1 may have another configuration. For example, the information processing apparatus 1 may include various processors in addition to the CPU.

The tag 2 described above has the processor 21 that controls each part of the tag 2, but a control means for controlling the tag 2 may have another configuration. For example, the tag 2 may have various processors in addition to the CPU.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

<6>

In the embodiments above, the term "processor" is broad enough to encompass one processor or plural processors in collaboration which are located physically apart from each other but may work cooperatively. The order of operations of the processor is not limited to one described in the embodiments above, and may be changed.

<7>

The program executed by the processor 11 of the information processing apparatus 1 described above is an example of a program causing a processor to execute a step of acquiring a first image and a second image in which lighting tags are captured among a plurality of images obtained by periodically capturing one or more tags that repeat blinking according to a determined pattern and a step of regarding the tags respectively indicated by the first image and the second image as identical to each other and specifying the pattern based on the tags in a case where a distance from a position of the tag indicated by the first image to a position of the tag indicated by the second image is within a range corresponding to a period from a time of capturing the first image to a time of capturing the second image.

The program executed by the processor 21 of the tag 2 is an example of a program causing a processor controlling a light fixed to a tag to execute a step of blinking the light according to a pattern corresponding to identification information identifying the tag 2, a step of lighting the light for a time equal to or larger than a determined first time in a case where the light is lighted according to the pattern, and a step of lighting off the light such that a period from lighting-off of the light to lighting of the light next time does not exceed a determined second time in a case where the light is continuously lighted off according to the pattern.

The programs may be provided in a state of being stored in a magnetic recording medium such as a magnetic tape and a magnetic disk, an optical recording medium such as an optical disk, a magneto-optical recording medium, and a computer readable recording medium such as a semiconductor memory. The programs may be downloaded through a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to
        acquire, among a plurality of images obtained by periodically capturing one or more lighting devices that repeat blinking according to a determined pattern, a first image and a second image in which a lighted lighting device is captured;
        in response to a distance from a position of the device indicated by the first image to a position of the device indicated by the second image being within a range corresponding to a period from a time of capturing the first image to a time of capturing the second image, regard the lighting device indicated by the first image and the lighting device indicated by the second image are the same; and
        specify the pattern of the lighting device that has been regarded the same.

2. The information processing apparatus according to claim 1,
    wherein the processor is configured to, upon a determination that the specified pattern does not satisfy a determined condition, change the first image to another image in which a lighted lighting device is captured among the plurality of images.

3. The information processing apparatus according to claim 2,
    wherein the another image is not used for the specifying of the pattern.

4. The information processing apparatus according to claim 3,
    wherein the condition is inclusion of a predetermined check pattern.

5. The information processing apparatus according to claim 4,
    wherein the processor is configured to regard, in response to the period from the time of capturing the first image to the time of capturing the second image exceeding a determined time and no other image of the lighting device indicated by the first image being acquired in the period, the first image and the second image does not have the same lighting device.

6. The information processing apparatus according to claim 3,
    wherein the processor is configured to regard, in response to the period from the time of capturing the first image to the time of capturing the second image exceeding a determined time and no other image of the lighting device indicated by the first image being acquired in the period, the first image and the second image does not have the same lighting device.

7. The information processing apparatus according to claim 3, wherein the processor is configured to:
    acquire, after the second image is captured, a third image in which a lighted lighting device is captured,
    in response to a distance from the position of the lighting device indicated by the second image to a position of the lighting device indicated by the third image being within a range corresponding to a period from the time of capturing the second image to a time of capturing the third image, regard the lighting device indicated by the first image, the lighting device indicated by the second image, and the lighting device indicated by the third image are the same, and
    specify the pattern of the lighting device that has been determined to be the same.

8. The information processing apparatus according to claim 2,
    wherein the condition is inclusion of a predetermined check pattern.

9. The information processing apparatus according to claim 8,
    wherein the processor is configured to regard, in response to the period from the time of capturing the first image to the time of capturing the second image exceeding a determined time and no other image of the lighting device indicated by the first image being acquired in the period, the first image and the second image does not have the same lighting device.

10. The information processing apparatus according to claim 8, wherein the processor is configured to:
   acquire, after the second image is captured, a third image in which a lighted lighting device is captured,
   in response to a distance from the position of the lighting device indicated by the second image to a position of the lighting device indicated by the third image being within a range corresponding to a period from the time of capturing the second image to a time of capturing the third image, regard the lighting device indicated by the first image, the lighting device indicated by the second image, and the lighting device indicated by the third image are the same, and
   specify the pattern of the lighting device that has been determined to be the same.

11. The information processing apparatus according to claim 2,
   wherein the processor is configured to regard, in response to the period from the time of capturing the first image to the time of capturing the second image exceeding a determined time and no other image of the lighting device indicated by the first image being acquired in the period, the first image and the second image does not have the same lighting device.

12. The information processing apparatus according to claim 2, wherein the processor is configured to:
   acquire, after the second image is captured, a third image in which a lighted lighting device is captured,
   in response to a distance from the position of the lighting device indicated by the second image to a position of the lighting device indicated by the third image being within a range corresponding to a period from the time of capturing the second image to a time of capturing the third image, regard the lighting device indicated by the first image, the lighting device indicated by the second image, and the lighting device indicated by the third image are the same, and
   specify the pattern of the lighting device that has been determined to be the same.

13. The information processing apparatus according to claim 1,
   wherein the processor is configured to regard, in response to the period from the time of capturing the first image to the time of capturing the second image exceeding a determined time and no other image of the lighting device indicated by the first image being acquired in the period, the first image and the second image does not have the same lighting device.

14. The information processing apparatus according to claim 1, wherein the processor is configured to:
   acquire, after the second image is captured, a third image in which a lighted lighting device is captured,
   in response to a distance from the position of the lighting device indicated by the second image to a position of the lighting device indicated by the third image being within a range corresponding to a period from the time of capturing the second image to a time of capturing the third image, regard the lighting device indicated by the first image, the lighting device indicated by the second image, and the lighting device indicated by the third image are the same, and
   specify the pattern of the lighting device that has been determined to be the same.

15. The information processing apparatus according to claim 1,
   wherein the processor is configured to specify identification information for identifying the lighting device based on the specified pattern.

16. A lighting device comprising:
   a light; and
   a processor configured to:
      blink the light according to a pattern corresponding to identification information of the lighting device;
      keep the light on for a first determined time or longer; and
      keep the light off such that a period from a light-off of the light to a subsequent light-on of the light does not exceed a second determined time,
      wherein the second determined time is determined according to a speed at which the lighting device is movable.

17. The lighting device according to claim 16, further comprising:
   a memory that stores a predetermined check pattern,
   wherein the pattern includes the check pattern.

18. The lighting device according to claim 16,
   wherein the first determined time is an exposure time of an imaging device that images the lighting device.

19. The lighting device according to claim 16,
   wherein the processor is configured to blink the lighter according to the pattern, then keep the light off for a light-off time that is longer than the second time, and then blink the light repeatedly according to the pattern.

20. A non-transitory computer readable medium storing a program causing a processor to execute:
   acquiring, among a plurality of images obtained by periodically capturing one or more lighting devices that repeat blinking according to a determined pattern, a first image and a second image in which a lighted lighting device is captured;
   in response to a distance from a position of the device indicated by the first image to a position of the device indicated by the second image being within a range corresponding to a period from a time of capturing the first image to a time of capturing the second image, regarding the lighting device indicated by the first image and the lighting device indicated by the second image are the same; and
   specifying the pattern of the lighting device that has been regarded the same.

* * * * *